(12) United States Patent
Glomann

(10) Patent No.: US 7,680,866 B2
(45) Date of Patent: Mar. 16, 2010

(54) SYSTEM AND METHOD FOR MANAGING RELATIONAL NUMERICAL DATA FOR MONITORING SYSTEMS

(75) Inventor: Bernhard Glomann, Bayonne, NJ (US)

(73) Assignee: Siemens Corporation, Iselin, NJ (US)

( * ) Notice: Subject to any disclaimer, the term of this patent is extended or adjusted under 35 U.S.C. 154(b) by 408 days.

(21) Appl. No.: 11/626,893

(22) Filed: Jan. 25, 2007

(65) Prior Publication Data

US 2007/0198461 A1 Aug. 23, 2007

Related U.S. Application Data

(60) Provisional application No. 60/763,705, filed on Jan. 31, 2006.

(51) Int. Cl.
*G06F 7/00* (2006.01)
*G06F 17/30* (2006.01)
(52) U.S. Cl. ...................................... 707/803
(58) Field of Classification Search ....................... None
See application file for complete search history.

(56) References Cited

U.S. PATENT DOCUMENTS

2005/0149617 A1* 7/2005 Turnbull et al. ............. 709/203

OTHER PUBLICATIONS

Maier et al "On the Foundations of the Universal Relation Model", ACM 1984, pp. 283-308.*
Arpaia et al "Multi-Agent remote predictive diagnosis of dangerous good transports", IEEE 2005, pp. 1685-1690.*
Osborn "Towards a universal relation interface" IEEE 1979, pp. 52-60.*
Kuck et al "A universal relation database system implemented via the network model", ACM 1982, pp. 147-157.*

* cited by examiner

*Primary Examiner*—Uyen T. Le

(57) ABSTRACT

An object-oriented system for managing relational numerical data includes a relation interface that provides access to a relation and its attributes and tuples, where an attribute is a data item with a numeric value and a relation is a set of n-tuples of attribute values, where the relation interface maintains its tuples in a fixed order and is adapted to selecting subsets of attributes and/or tuples where a new relation interface instance is created, an iterator interface for iterating over the tuples of a relation, where the iterator is adapted to acquiring the tuple attribute data as data is being accessed, and a notification interface for notifying other classes whenever changes occur in a relation interface instance.

26 Claims, 5 Drawing Sheets

SYSTEM AND METHOD FOR MANAGING RELATIONAL NUMERICAL DATA FOR MONITORING SYSTEMS

CROSS REFERENCE TO RELATED UNITED STATES APPLICATIONS

This application claims priority from "Software Architecture for Managing Relational Numerical Data", U.S. Provisional Application No. 60/763,705 of Bernhard A. Glomann, filed Jan. 31, 2006, the contents of which are incorporated herein by reference.

TECHNICAL FIELD

This invention is directed to the management of numerical data for monitoring systems.

DISCUSSION OF THE RELATED ART

Monitoring systems are used in many industries to keep track of various kinds of sensors, process data, and to take actions based on this data. Examples for monitoring systems can be found in power plants, process automation and health monitoring. An important application of monitoring systems is predictive maintenance, which can help reduce maintenance costs by eliminating the need for some regularly scheduled maintenance while preventing unexpected failures and shutdowns.

Monitoring systems typically face many challenges. Input data can come from multiple sources, and/or can be of various types. The systems should be capable of handling large volumes of data. In addition, data should be usable in multiple operation modes, such as configuration/training, offline monitoring and online monitoring.

Monitoring systems use various types of data, such as scalar values, multivariate sensor data, spectral data and images. Most of these types of data are made up of numerical values that are related to each other in specific ways. For example, data from different sensors correspond to each other by time, image data is arranged in a common coordinate system, etc. FIG. 1 depicts an overview of a monitoring system based on a relational numerical data representation. This data representation serves as a common interface between different modules that operate on the data. FIG. 1 shows the following types of modules. Data import modules 11 read data from various data sources, such as files, databases, and OPC servers, etc., and make them available to other modules in a relational numeric representation 12. Data export modules 13 write data to external destinations in various formats. Algorithm modules 15 perform calculations on data and feed their results back into the relational representation. Visualization modules 14 create visual representations of data for display to the user. The relational representation supports training as well as monitoring and allows algorithms to be used without changes for online and offline processing.

The following concepts form the basis for a class of software that is commonly referred to as Relational Database Management Systems (RDBMS). These systems usually support selection, projection, sorting and other operations on relational data, using textual queries specified in the Structured Query Language (SQL).

A relation R with n attributes $a_1, \ldots, a_n$ is a subset of the Cartesian product of sets $A_1, \ldots, A_n$, where each $A_i$ is the set of possible values for attribute $a_i$: $R \subseteq A_1 \times \ldots \times A_n$. For the purposes of this document, each $A_i$ can be assumed to be a subset of the set of real numbers: $A_i \subseteq \mathbb{R}$. Each element of R is an n-tuple $(x_1, \ldots, x_n)$ where $x_i \in A_i \cup \{\epsilon\}$ for $i \in \{1, \ldots, n\}$. Each $x_i$ is the value of attribute $a_i$ for this tuple, or $\epsilon$ if the tuple does not have a value for $a_i$. A selection operation on a relation R yields a subset $S \subseteq R$, containing only tuples that satisfy a given condition. A projection operation on a relation R yields a relation P with only a subset of the attributes of R. That is, if R has attributes $a_1, \ldots, a_n$, then P has attributes $a_{m_1}, \ldots, a_{m_k}$ where $m_i \in \{1, \ldots, n\}$ and $m_i \neq m_j$ for $i, j \in \{1, \ldots, k\}$ with $i \neq j$. Each tuple $(x_1, \ldots, x_n) \in R$ is mapped to the tuple $(x_{m_1}, \ldots, x_{m_k}) \in P$.

SUMMARY OF THE INVENTION

Exemplary embodiments of the invention as described herein generally include methods and systems for treating these types of data in a uniform way as relational numerical data. A software architecture according to an embodiment of the invention described herein below provides a specialized subset of the functionality of an RDBMS. The main differences include: (1) only numerical data is supported; (2) additional operations specific to numerical data are provided, such as interpolation; and (3) instead of text-based queries, structured method parameters are used to specify operations.

Application-specific products based on an architecture according to an embodiment of the invention include a condition assessment and prognosis component for predictive maintenance of a particle therapy system, and a machine condition monitoring plug-in extension for a component-based power plant control system. Other potential monitoring applications include process monitoring for automated production processes, and applications involving numerical data, such as data analysis, statistics and image processing. Further embodiments of an architecture of the invention implement sub-sampling, which is selecting a lower-resolution subset from a relation, based on the key attributes, and join operations, the merging of data from multiple relation instances, based on common attribute values.

According to an aspect of the invention, there is provided an object-oriented system for managing relational numerical data comprising a relation interface that provides access to a relation and its attributes and tuples, wherein an attribute is a data item with a numeric value and a relation is a set of n-tuples of attribute values, wherein said relation interface maintains its tuples in a fixed order and is adapted to selecting subsets of attributes and/or tuples wherein a new relation interface instance is created, an iterator interface for iterating over the tuples of a relation, wherein said iterator is adapted to acquiring the tuple attribute data as said data is being accessed, and a notification interface for notifying other classes whenever changes occur in a relation interface instance.

According to a further aspect of the invention, the system comprises a tuple interface for providing access to tuple values for each attribute of a relation, wherein each tuple interface instance is associated with a particular relation interface instance, and wherein said iterator interface extends said tuple interface and is further adapted for saving and restoring a current position in the tuples of said relation, for moving to a tuple position defined by an attribute value, determining whether an iterator's current position corresponds to one of a relation's tuples and whether a current tuple is the first tuple in a continuous segment of tuples within the relation.

According to a further aspect of the invention, the system comprises an attribute interface that represents an attribute of a relation, said attribute interface adapted for providing access to said attribute's identifier, numeric data type, metadata, range of values assumed by said attribute in said relation, value status and actual value of said attribute, wherein each attribute interface instance is associated with a relation interface instance.

According to a further aspect of the invention, the metadata of an attribute includes a textual description of said attribute, the measurement used for the attribute's values, and allowable range of values for the attribute.

According to a further aspect of the invention, the relation interface is further adapted to selecting a subset of attributes to identify tuples in a relation.

According to a further aspect of the invention, the system comprises an identifier interface that represents an identifier for attributes that can be used across multiple relations, wherein an attribute common to a plurality of relations is identified by a single name.

According to a further aspect of the invention, the system comprises a condition interface for evaluating one or more attribute conditional expressions for selecting attributes for a tuple.

According to a further aspect of the invention, the relation represents a plurality of time based sensor measurements, wherein each attribute is associated with measurements from one sensor, and each attribute value is associated with a time stamp.

According to a further aspect of the invention, the system comprises a source layer that acquires attribute data from one or more data sources as a time series of measurements with associated timelines and sorts the measurements for each attribute; and a processing layer that merges timelines for each of the measurement time series into a single merged timeline, makes the measurement data available to an application program, and that includes a cache for storing data acquired from the source layer.

According to a further aspect of the invention, the cache, when an application requests measurement data in a specified time range with a start time and an end time, determines whether a data cluster stored in said cache covers said time range, and if so, returns said cluster to said application, wherein if a cluster does not cover the requested time range, determines the start time of a new time range from a cluster stored in said cache, wherein if said new start time is before the requested end time, said cache returns data in the range of said requested start time and said new start time, and wherein if said new start time is after the requested end time, said cache returns data in the range of said requested start time and said requested end time.

According to a further aspect of the invention, the processing layer merges timelines by associating an index variable with each attribute that corresponds with its timestamp in the merged timeline, comparing timestamps of all attributes at a position indicated by said index variable to find a next timestamp, and adding the next timestamp to the merged timeline.

According to a further aspect of the invention, the relation represents a bitmap color image using red, green, and blue color values, wherein each pixel of said bitmap image is associated with an attribute for each of its coordinates and each of its color values.

According to another aspect of the invention, there is provided a program storage device readable by a computer, tangibly embodying a program of instructions executable by the computer to implement a system for an object-oriented system for managing relational numerical data.

DETAILED DESCRIPTION OF THE PREFERRED EMBODIMENTS

Figure 1:
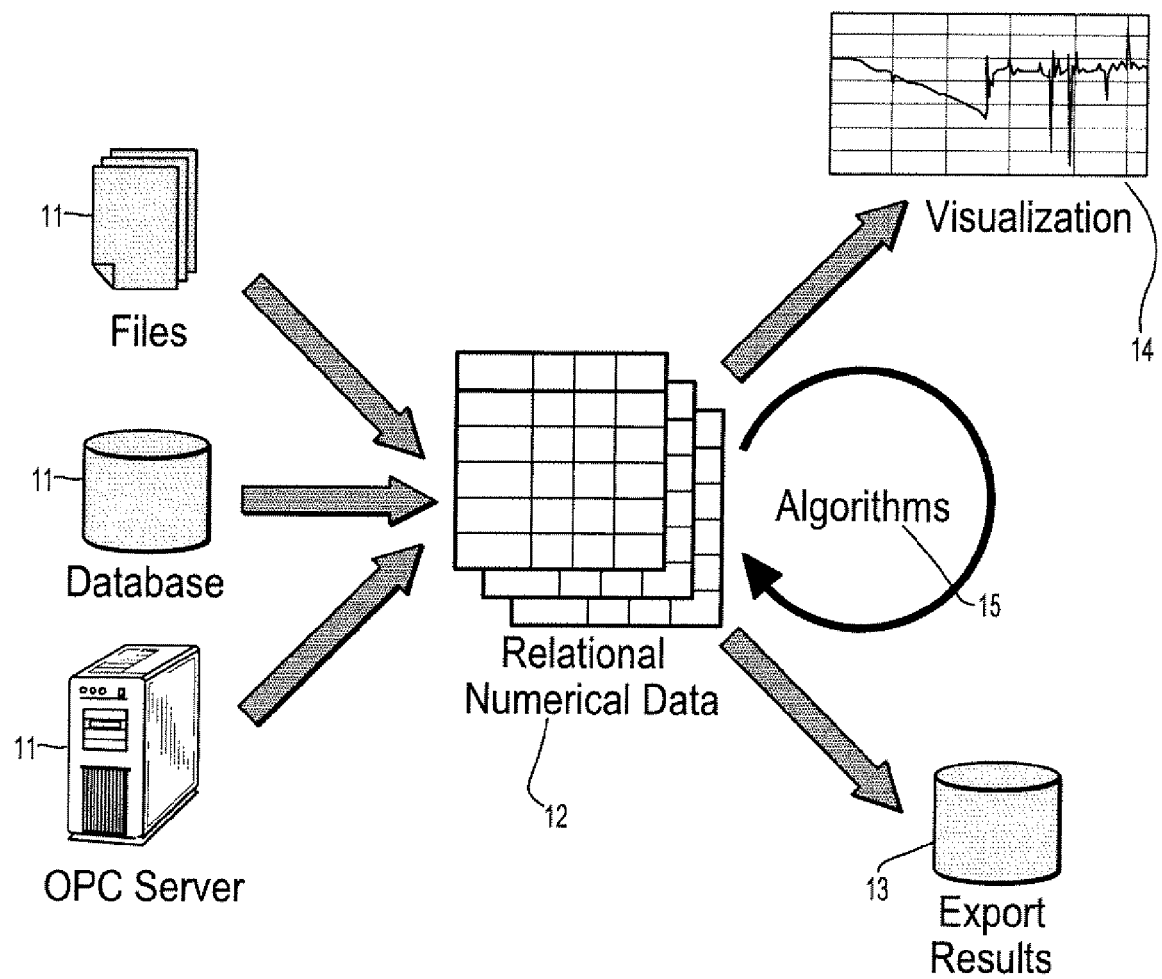
FIG. 1 depicts an overview of a monitoring system based on a relational numerical data representation, according to an embodiment of the invention.

Exemplary embodiments of the invention as described herein generally include systems and methods for managing relational numeric data in monitoring systems. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The creation of a class design according to an embodiment of the invention as described herein below has been guided by the following goals. A programmatic model is designed for representing relational numerical data without imposing unnecessary constraints on its implementation. The design allows implementation of algorithms and processing functions that work with relational numerical data without depending on a specific way of acquiring, managing or storing this data. Timestamps are treated as a separate attribute in the same way as numerical data, thus simplifying the implementation of algorithms that do not depend on the semantics of time, and allowing working with data that does not have timestamps. The specified interfaces are implemented in an efficient way for high performance data processing.

As an example of the concepts defined above, consider a weather monitoring system with sensors acquiring data on temperature, pressure, humidity, wind speed and direction, etc. The data would then be a time series of tuples of (measurement-value, time-stamp). In a non-limiting embodiment of the invention that supports scalar values for each attribute, vector data, such as direction, would be represented using a separate attribute for each dimension of the vector. The wind direction could be represented in coordinates, such as longitude and latitude, although it could also be represented as an angle. In this example a tuple would include 7 attributes: time, temperature, pressure, humidity, wind speed, wind direction longitude, and wind direction latitude. Each tuple would contain a value for each attribute, for example: 1/22/2007 3:00 PM, 33 (degrees F.), 29.84 (inches), 66 (%), 10 (mph), −1 (degrees), 1 (degrees). The relation would be a set of such tuples, in this case a time series of measurements. The time is treated as just another attribute, and in general relations do not need to have a time attribute, although time-based data would include relations with a time attribute). As another example, a bitmap image using the RGB color model could be represented as a relation with 5 attributes: x coordinate, y coordinate, red value, green value, blue value. Each pixel in the image would then correspond to a 5-tuple in the relation.

Figure 2:
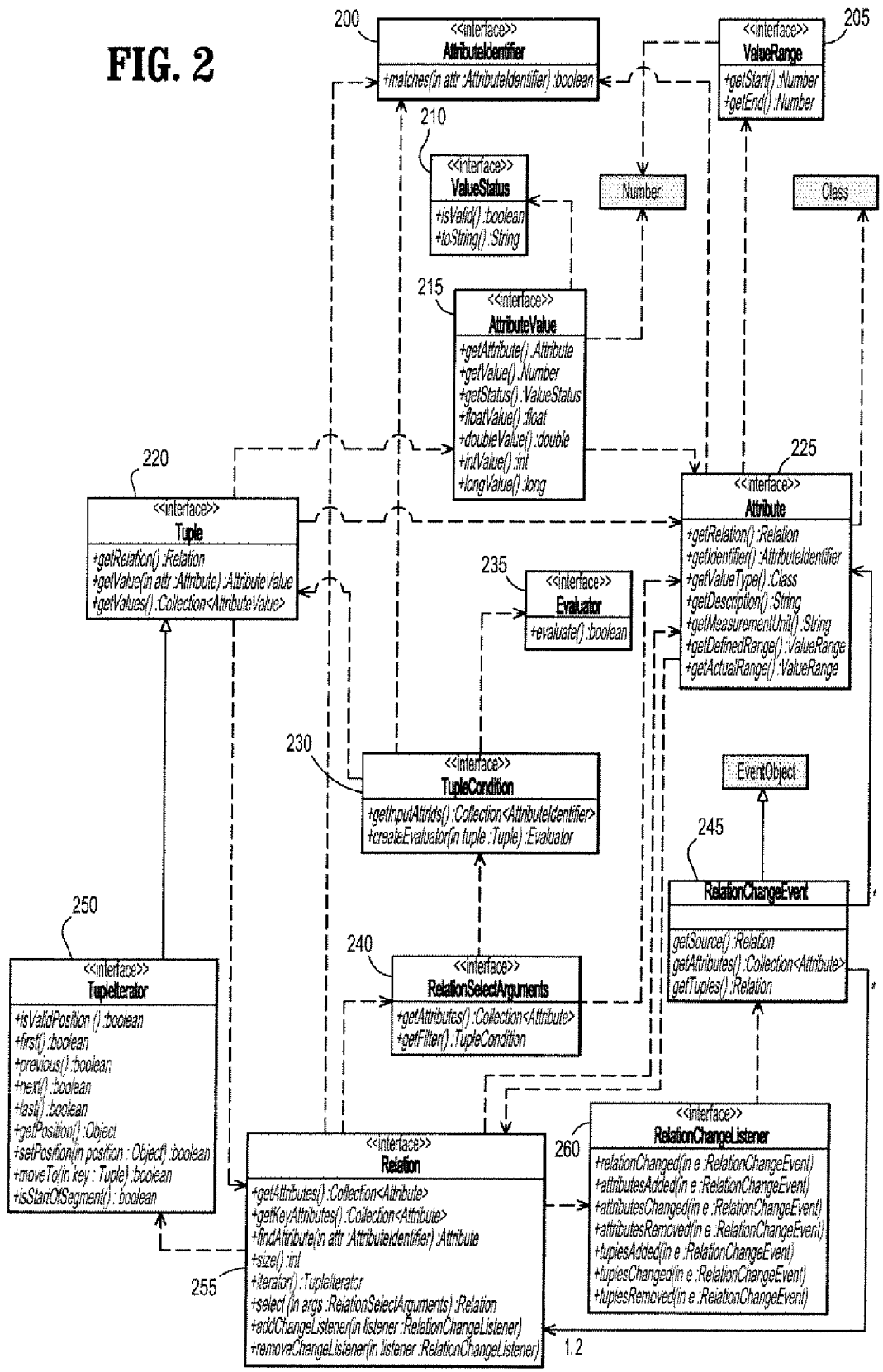
FIG. 2 is a UML class diagram of a software architecture according to an embodiment of the invention.

A Unified Modeling Language (UML) class diagram of a software architecture according to an embodiment of the invention is shown in FIG. 2. In the UML, a class diagram is a type of static structure diagram that describes the structure of a system by showing the system's classes, their attributes, and the relationships between the classes. In this diagram, arrows between class boxes have meanings as follows:

- A dotted-line arrow going from A to B means that A depends on B, usually because B is used as a parameter or return value type in a method declaration in A.
- Solid-line arrows with open arrow heads are associations, so a solid-line arrow going from A to B means that instances of A (may) contain references to instances of B.
- A solid-line arrow with triangular arrow head going from A to B means that A extends (inherits from/is derived from/is a specialization of) B.

In addition, a '+' preceding a method name indicates that it is a public method. Shaded boxes, which are not numbered, are part of the standard API for the Java language, an exemplary, non-limiting object-oriented language for implementing this class diagram.

An association from A to B basically means that each instance of A contains a variable of type B, which also implies that A depends on B, because the name "B" will appear in the source code of A. In other words, an association is also a dependency. So if there is an association between A and B, it would not be wrong to draw a dotted (dependency) arrow in addition to the solid (association) arrow, but it would be redundant. So in practice a dotted arrow is only used if "A depends on B" is all that can be said about the relationship between A and B and no stronger statement can be made, such as "A is associated to B". A typical example for this is the case that instances of B are passed in or out of A's methods without being stored inside A across method calls. If instances of A do keep references to instances of B across method calls, then it is an association. In most cases, the association is initialized by passing an instance of B as a parameter to a method or constructor of A. But if there was no association, meaning no place in A's internal state to store a reference to an instance of B, then the reference would be lost (from A's perspective) as soon as the method returns. Associations are just instance variables (members of one class instance's internal state) that can hold references to instances of another class. Another aspect about associations is their multiplicity. There can be many references in an instance of A to instances of B, and there can also be different multiplicities, such as one-to-many or many-to-many associations.

Many of the classes in FIG. 2 are interfaces. An interface is a set of methods that defines a programmatic mechanism by which separate software components can communicate. An interface cannot contain any data or variables, which also means that they cannot have associations to other classes or interfaces, because as explained above, associations are instance variables. An interface allows access to a classes resources only through well-defined entry points, maintaining a basic design principle of prohibit access to all resources by default. An object's interface consists of a set of methods that the object must respond to. The interface of a software module A is deliberately kept separate from the implementation of that module. The latter contains the actual code of the procedures and methods described in the interface, as well as other "private" variables, procedures, etc. Any other software module B that interacts with A is forced to do so only through the interface. In the Java programming language, an interface specifies a set of methods which implement some specific functionality, common to a set of classes.

Referring now to the figure, a software architecture according to an embodiment of the invention includes the following classes and interfaces. In the following description, interface and class names are indicated in boldface, and method names are italicized.

Relation 255 is an interface that represents a relation and provides access to its attributes and tuples. The *getAttributes* method returns all attributes of the relation, while the *getKeyAttributes* method returns a subset of attributes that can be used to uniquely identify tuples in the relation, which is analogous to a primary key in an RDBMS. The *size* method returns the number of tuples in the relation. The Relation interface depends on the TupleIterator 250, RelationSelectArguments 240, Attribute 225, AttributeIdentifier 200, and RelationChangeListener 260 interfaces, described below. The remaining methods of the Relation interface are described in the context of related interfaces in the following paragraphs.

AttributeIdentifier 200 is an interface that represents an identifier for attributes that can be used across multiple relations, e.g. to identify common attributes by name, or to use a fixed AttributeIdentifier instance to refer to the timestamp attribute in all relations. The *matches* method returns true if an attribute matches the identifier. The *findAttribute* method of the Relation interface returns the attribute identified by a given AttributeIdentifier instance.

Attribute 225 is an interface that represents an attribute of a relation. Each Attribute instance is associated with a particular Relation instance, which is returned by the *getRelation* method. More precisely, each instance of a class implementing the Attribute interface is associated with a particular instance of a class implementing the Relation interface. The *getIdentifier* method returns the attribute's identifier. The *getValueType* method returns the numeric data type used for the attribute's values. The methods *getDescription*, *getMeasurementUnit* and *getDefinedRange* return optional metadata about the attribute: a textual description, the measurement unit used for the attribute's values, and the range of values allowed for the attribute, respectively. The *getActualRange* method returns the range of values that this attribute actually assumes across all the tuples in the relation. These last two methods have return values of type ValueRange 205.

ValueRange 205 is an interface that represents a range of values defined by a lower bound and an upper bound, which are returned by the *getStart* and *getEnd* methods, respectively.

Tuple 220 is an interface that represents a tuple in a relation. Each Tuple instance is associated with a particular Relation instance, which is returned by the *getRelation* method. More precisely, each instance of a class implementing the Tuple interface is associated with a particular instance of a class implementing the Relation interface. The Tuple interface provides access to the tuple's values for each of the relation's attributes. The *getValue* method returns the value for a given Attribute instance, and the *getValues* method returns the values for all attributes. These values are of type AttributeValue, described next.

AttributeValue 215 is an interface that represents an attribute's value. Each AttributeValue instance is associated with a particular Attribute instance (the attribute whose value it represents), which is returned by the *getAttribute* method. The methods *getValue*, *floatValue*, *doubleValue*, *intValue* and *longValue* return the attribute's numerical value in various data types. The *getStatus* method returns the status associated with the value, of type ValueStatus, described next.

ValueStatus 210 is an interface that represents the status of a value, such as valid, no value, uncertain, measurement failed etc. The isValid method returns true if the value should be considered valid, and the toString method provides more specific information in the form of a human-readable description.

TupleIterator 250 is an interface that provides a way of iterating over the tuples of a relation. TupleIterator inherits from interface Tuple 220. The iterator method of the Relation interface returns a TupleIterator instance. Each Relation instance maintains its tuples in a fixed order, and this order is followed by the next method of the TupleIterator interface. At any given time, a TupleIterator instance points to a particular tuple (i.e. the current tuple) in the relation. As a subinterface of Tuple, the TupleIterator interface provides access to the current tuple's values. In addition, it provides methods for changing the current tuple by moving to the next, previous, first or last tuple (methods first, previous, next, and last), for saving and restoring the current position (methods getPosition and setPosition), and for moving to a position defined by key attribute values (moveTo method). When moving around the tuples in this way, any existing AttributeValue instances obtained from this TupleIterator instance (using the getValue or getValues method) will move in the same way: i.e., an AttributeValue instance always refers to the values of the current tuple. The isValidPosition method returns true if the iterator's current position corresponds to one of the relation's tuples. The isStartOfSegment method returns true if the current tuple is the first tuple in a continuous segment of tuples within the relation. This means that no line should be drawn between this tuple and the previous one when displaying the data graphically.

RelationSelectArguments 240 is an interface that provides the arguments for the select method of the Relation interface. The getAttributes method returns a subset of attributes for projection, and the getFilter method returns a filter condition, of type interface TupleCondition, described next, for selection. The result of the select method is another Relation instance, whose data is derived from the current Relation instance according to the parameters described above. According to an embodiment of the invention, the new Relation instance might not contain a copy of the data, but might rather just present another "view" that internally refers to the same data as the original Relation instance.

TupleCondition 230 is an interface that represents a condition that can be evaluated on a tuple by calling the createEvaluator method, which yields an Evaluator instance. The getInputAttrIds method returns identifiers of the input attributes of type interface AttributeIdentifiler required to evaluate the condition.

Evaluator 235 is an interface that evaluates a condition with the evaluate method on a specific Tuple instance, possibly taking its neighborhood into account, and yields a boolean value of true or false.

RelationChangeListener 260 is an interface that, together with the addChangeListener and removeChangeListener methods of the Relation interface, provides a mechanism for other classes to be notified whenever changes occur in a Relation instance. For example, this mechanism can be used to implement continuous processing of data as it becomes available. The methods attributesAdded, attributesChanged and attributesRemoved are called when attributes are added, changed or removed, respectively. The methods tuplesAdded, tuplesChanged and tuplesRemoved are called when tuples are added, changed or removed, respectively. The relationChanged method is called when an unspecified or different kind of change is to made to the relation. These methods take as parameters events of the RelationChangeEvent class, described next.

RelationChangeEvent 245 is a class that provides information about a change in a Relation instance, which is returned by the getSource method. The getAttributes method returns the affected attributes, and the getTuples method returns the affected tuples, if applicable. According to an embodiment of the invention implemented in Java, the RelationChangeEvent inherits from the standard Java API class EventObject. The RelationChangeEvent is associated with the Relation interface and the Attribute interface. The association from RelationChangeEvent to Attribute is a many-to-many association, which means that each instance of RelationChangeEvent does not only contain one variable to hold a reference to an instance of Attribute, but rather a list or array of references to any number of instances of Attribute. In addition, each Attribute instance may be referenced by any number of RelationChangeEvent instances. This is indicated by the * by the start of arrow from the RelationChangeEvent box to the Attribute box and by the arrow head, which means any number from 0 to infinity. Each RelationChangeEvent instance is also associated to 1 or 2 Relation instances: the relation from which the event originated (returned by the getSource method), and optionally another Relation instance containing only the affected tuples (returned by the getTuples method). This is indicated by the * by the start of arrow and the '1 . . . 2' by the arrow head.

The interfaces described above were designed to be as general as possible without imposing excessive penalties on the performance of their implementation and use. The Relation interface defines a common way of accessing numerical data, which can be used to write algorithms in a way that is independent of how the underlying data is actually managed or stored. Any class implementing the Relation interface can then be used as input to such algorithms.

The individual values in a relation can only be accessed one by one using the TupleIterator interface. This approach does not require the underlying data to be represented explicitly in memory, such as in an array. Instead, data can be loaded or generated incrementally as it is accessed through the iterator. For example, it would be possible to define a class that implements the Relation interface and represents "the set of prime numbers between 1 and n", computing each prime number only as it is accessed through the iterator.

A numerical operation such as interpolation, mentioned above, can be performed implicitly, according to the implementation of an embodiment of the invention. The moveTo method of the TupleIterator interface allows one to move to a place "between tuples". For example, one could call the moveTo method specifying a time stamp of 3:30 PM, even though the relation may only contain tuples with measurements taken at 3 PM and 4 PM. Now the specific relation implementation could simply choose to consider the iterator to be at an empty tuple with no values, or it could construct a "virtual" tuple on the fly containing values interpolated from the values measured at 3 PM and 4 PM.

The select method of the Relation interface allows creating subsets of data by selecting specific attributes and/or tuples. The result of this method is another Relation instance, which means that any algorithm can be applied to a subset of data just the same way as it can be applied to the whole data set.

The Relation interface can also represent dynamic data and supports notifications of data updates through the RelationChangeListener interface. This allows writing algorithms that can be applied to static/archived data as well as to dynamic/ online data. For monitoring applications, this means that data can be accessed in the same way in both training and monitoring modes.

The following are some examples of how these interfaces can be implemented efficiently.

Some algorithms require input data in the form of a matrix. This is supported by the proposed architecture, since each tuple can be considered as a row or column vector in a matrix. However, this does not mean that all data has to be acquired and stored in this form. For example, when using time-based sensor data, some sensors may provide more frequent measurements than others. This means that some elements in a matrix may be missing, which can be represented by associating those values with a ValueStatus instance for "no value". In an embodiment of the invention, the Relation interface may choose not to store such data as a matrix, but rather in a more memory efficient way, such as using separate arrays of different lengths for each sensor.

Attributes are usually identified by names, IDs etc. These identifiers are represented by the AttributeIdentifier interface. However, it would not be efficient to do frequent lookups of attributes by name, for example, even if a hash table is used. This is why there are two additional interfaces for accessing attributes: Attribute and AttributeValue.

An Attribute instance identifies an attribute within a Relation instance. In an embodiment of the invention, the implementation of the Attribute interface can be specific to the implementation of the Relation interface and contain some internal values, such as array indices, that allow quick access to the attribute's data within the relation.

When iterating over the values of a relation using the TupleIterator interface, attribute values can be accessed efficiently using the AttributeValue interface. An AttributeValue instance for a specific attribute can be obtained from the TupleIterator instance using the getValue method. The AttributeValue instance remains valid throughout the lifetime of the TupleIterator instance and "moves" with the iterator. For example, when iterating over the tuples in a relation, an AttributeValue instance for a specific attribute can be obtained before the loop starts, and can then be reused in every iteration of the loop to directly retrieve the numerical value at the current iterator position, e.g., using the doubleValue method. No objects need to be created within the loop, thus avoiding the performance penalty of frequent memory allocation.

The following non-limiting example of Java code shows how to iterate over the values of an individual attribute:

```
public double computeSum(Relation rel, AttributeIdentifier attrId) {
    // Create a view of the relation that contains only the attribute
    // that we are interested in
    Attribute attr = rel.findAttribute(attrId);
    Relation view = rel.select(new SelectArgs(Arrays.asList(attr)));
    // Set up the iteration
    attr = view.findAttribute(attrId);
    TupleIterator it = view.iterator( );
    AttributeValue value = it.getValue(attr);
    // Iterate over the attribute values and sum them up
    double sum = 0;
    while (it.next( )) {
        sum += value.doubleValue( );
    }
    return sum;
}
```

The select method of the Relation interface supports a general selection mechanism using an instance of the TupleCondition interface as a filter. For this purpose, an implementation of the select method according to an embodiment of the invention could call the createEvaluator method of the TupleCondition interface and simply iterate over all tuples and call the evaluate method of the Evaluator interface for each tuple to decide whether or not to include it in the result. However, there are special cases that can be handled in more efficient ways. For example, a common way of selecting a subset of time-based sensor data is by specifying a time range, so that only data whose timestamps fall within this range will be returned. For this purpose, in another embodiment of the invention, a specialized subclass of the TupleCondition interface can be defined, e.g. called RangeFilter, containing the start and end of the time range of interest. Now the implementation of the select method can be extended to treat this special case more efficiently. It can first check whether the given TupleCondition instance is in fact an instance of the RangeFilter class. If so, and if the tuples in the relation are sorted by time, it can determine the first and last tuples that fall within the given time range and iterate only over those tuples, instead of iterating over all tuples and calling the evaluate method of the TupleCondition interface every time.

An embodiment of the invention can provide a general mechanism that supports a wide range of functionality without additional programming effort, but also allows fine-tuning to improve the performance for special cases.

One common type of data to be used with an architecture according to an embodiment of the invention is time-based data, where each value is associated with a timestamp. In order to support various types of data sources while minimizing implementation effort and code duplication, a layered approach can be used for an embodiment of the invention that implements the above-described interfaces for time-based data.

Figure 3:
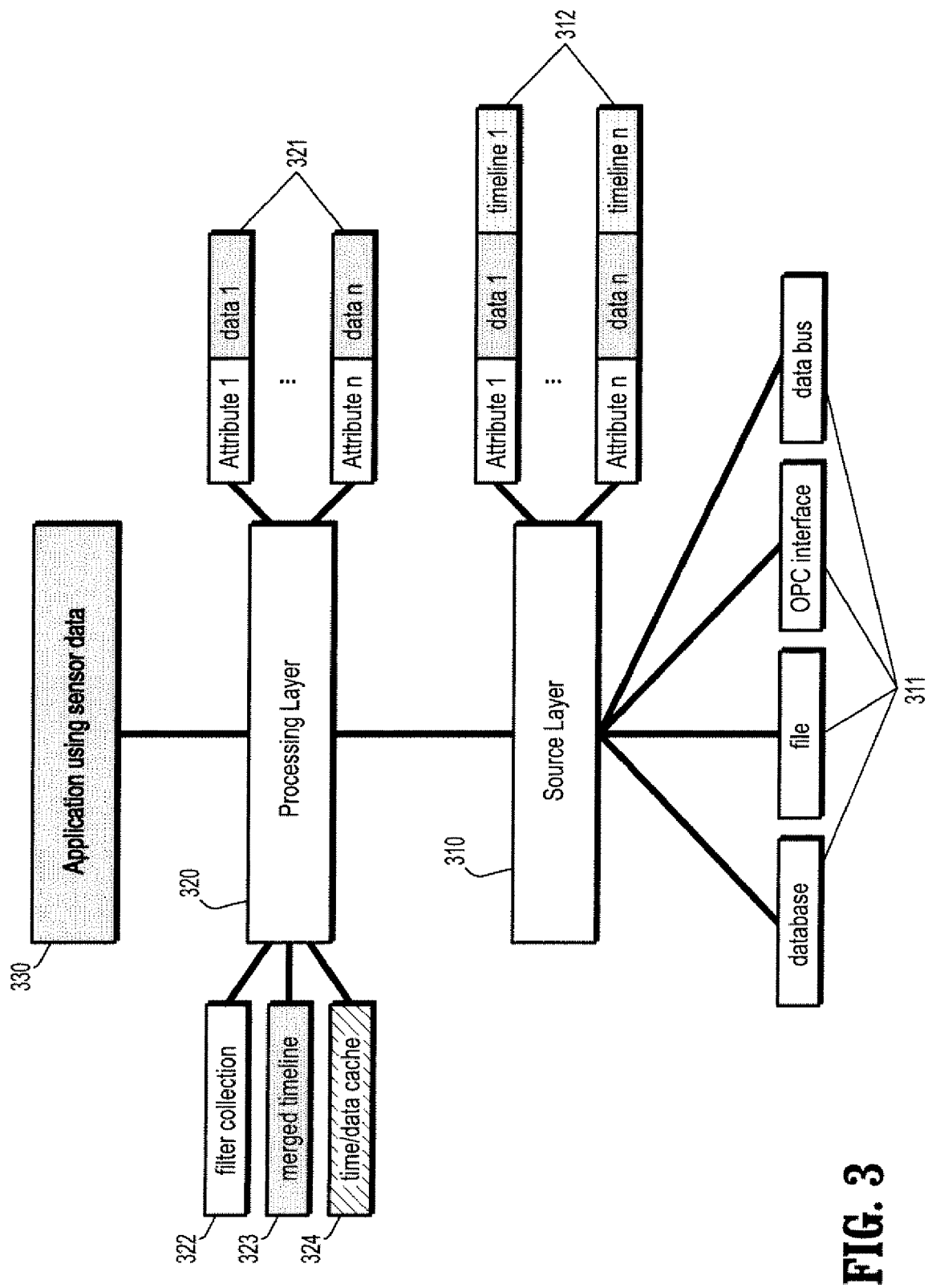
FIG. 3 is a block diagram of a layered architecture for interfacing timed-based data, according to an embodiment of the invention.

FIG. 3 is a block diagram of a layered architecture for interfacing timed-based data, with two layers, a source layer 310 and a processing layer 320. A processing layer 320 according to an embodiment of the invention implements common operations, such as cache management, merging of timelines, filtering, etc., and leaves only the basic task of actually acquiring the data to each source-specific implementation in the source layer, rather than having to implement all the interfaces from FIG. 2 for every type of data source. An application program 330 that uses the attribute data would access that data only through the processing layer 320. The source layer 310 retrieves data from one or more data sources 311. These sources 311 include files, a database, real-time data acquired through an OPC interface from data acquisition devices such as sensors, and a data bus. The source layer's respective implementation is responsible for the correct configuration and data acquisition method for a specific type of data source. It makes the data 312 accessible through a common interface, where data is organized according to attribute, e.g., the sensor device from which it was acquired, and each attribute has its own timeline (set of timestamps).

The source layer 310 is connected to a processing layer 320 which is responsible for reorganizing the data 312 and adding processing features. Both layers communicate only via the predefined layer interfaces so that communication is independent from the implementations. The processing layer restructures the data 312 by gathering all timelines from the different attributes and merging them into a common timeline 323. All attributes in the processing layer share the common, merged timeline. The attribute values are internally associated with their time stamps by their indices, as described below in connection with merging of the timelines.

In addition, the processing layer manages selection operations. The filter collection 322 contains instances of classes implementing the TupleCondition interface, which have been used as filters in selection operations (see the getFilter method in the RelationSelectArguments interface). Processing layer 320 includes classes that implement the interfaces of FIG. 2, including a class that implements the Relation interface. When the first instance of this relation class is created, its filter collection is empty, meaning that this relation represents all the data from the source layer. If the select method is then called on this relation instance, a new instance of the same class is returned, and this new instance's filter collection contains one filter: the filter from the getFilter method of the RelationSelectArguments instance that was passed as a parameter to the select method. If the select method is called again on this new relation instance, yet another instance of the same class is returned, with two filters in its filter collection, one from each call to the select method. So the filter collection contains all the filters that have been cumulatively applied in order to arrive at this relation instance. This is how the processing layer manages selection operations according to an embodiment of the invention.

The processing layer is equipped with a cache 324, so data which has been acquired from the source layer 310 once does not have to be acquired a second time. The cache 324 uses an approach of minimal acquisition. That is, the cache locates data clusters for a requested time range [S, E] which are already stored. The cache organizes the stored clusters, gets the missing data clusters from the source layer 310 and finally merges the data into a new cluster.

Figure 4:
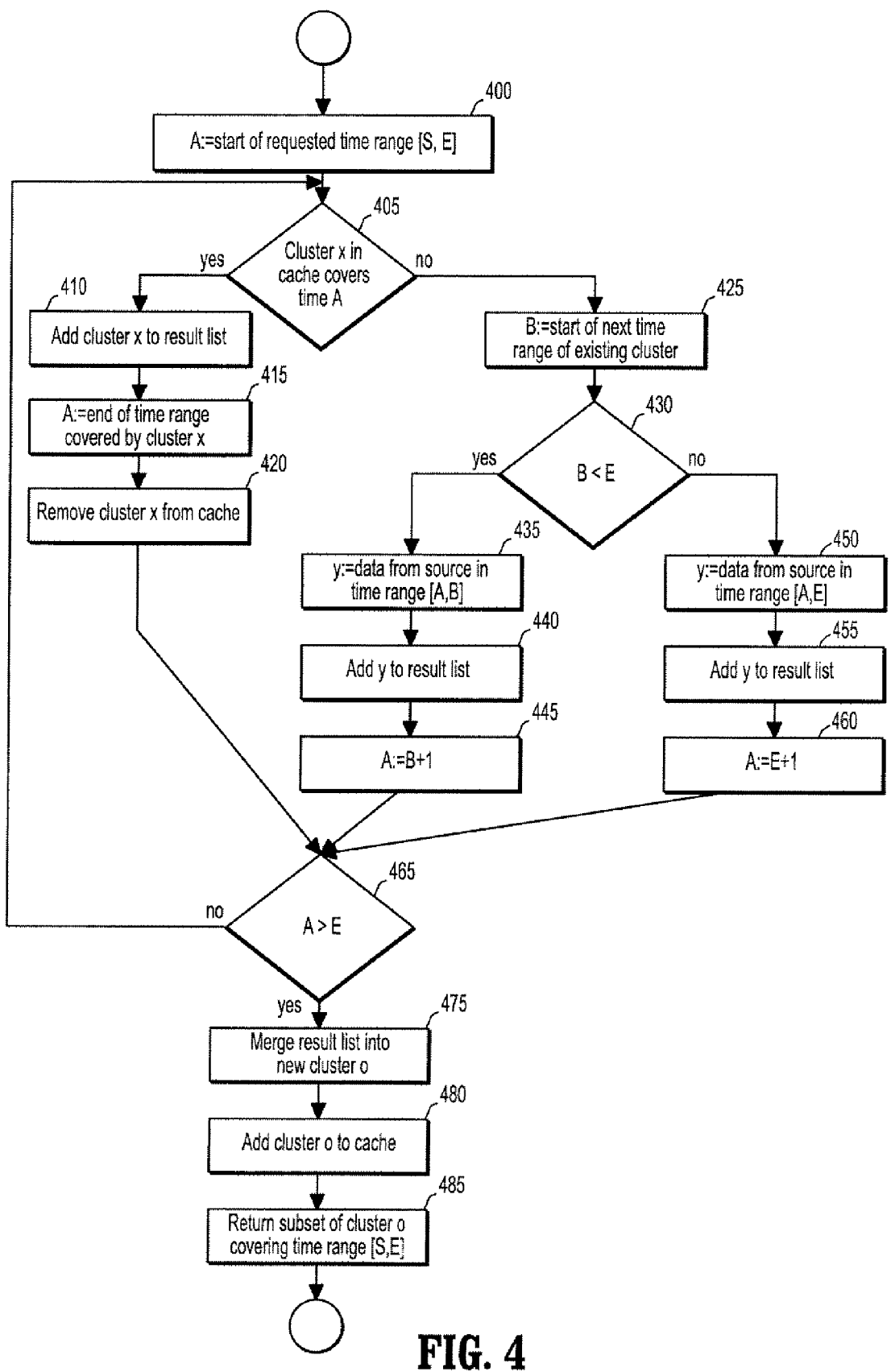
FIG. 4 is a flowchart of a method of operating a cache, according to an embodiment of the invention.

A flowchart of a method of operating a cache is shown in FIG. 4. According to an embodiment of the invention, a cache operation begins at step 400 by initializing a result list and declaring a time variable A and setting it equal to S, the start of the requested time range [S, E]. Then for each existing cluster x in the cache, if at step 405 the time range associated with the cluster x covers time A, cluster x is added to the result list at step 410. At step 415, A is set equal to the end of the time range covered by cluster x, and cluster x is removed from the cache at step 420. Otherwise, if the time range associated with the cluster x does not cover time A, declare and set at step 425 another time variable B to the start of a time range covered by an existing cluster in the cache. If, at step 430, time B is before time E, then, at step 435 retrieve data for the time range [A, B] from the source layer and add it to the result list at step 440. Set time A to B+1 at step 445. If time B is after time E, then, at step 450 retrieve data for time range [A, E] from the source layer and add it at step 455 to the result list. Set time A to E+1 at step 460.

If, at step 465, time A is before time E, and there are more clusters in the cache, the method returns to step 405. Otherwise, the clusters in the result list are merged at step 475 to create a new cluster o. This cluster o is added to the cache at step 480, and the subset of cluster o covering the time range [S, E] is returned to the caller at step 485.

As mentioned above, the processing layer 320 is responsible for merging the timelines of different attributes in order to make the data available in a synchronized relational form through the interfaces described in connection with the class diagram of FIG. 2. A merging algorithm according to an embodiment of the invention utilizes the fact that all sensor data provided by the source layer is already sorted for each attribute. According to a non-limiting embodiment of the invention, the data is sorted in ascending order. The merging algorithm uses an index variable per attribute in order to determine which timestamps are already included in the central timeline and store those that already included. The merging algorithm compares the timestamps of all attributes at the position indicated by the index variable to find the next timestamp, which is added to the central timeline, and then increments the corresponding index variable.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
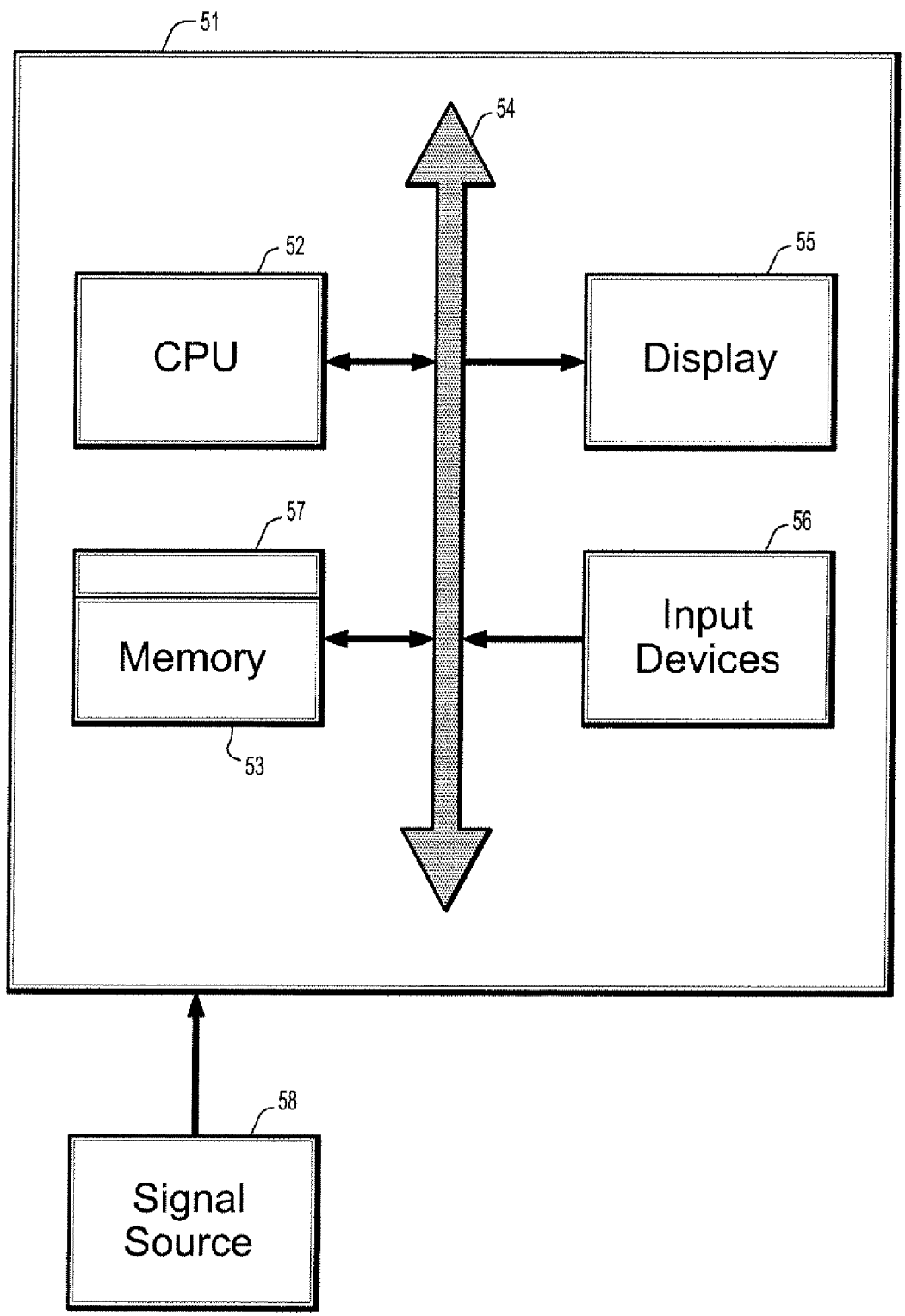
FIG. 5 is a block diagram of an exemplary computer system for implementing a method for managing relational numeric data, according to an embodiment of the invention.

FIG. 5 is a block diagram of an exemplary computer system for implementing a system for managing relational numeric data, according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-implemented object-oriented system for managing relational numerical data, comprising:
   a relation interface that provides access to a relation and its attributes and tuples, wherein an attribute is a data item with a numeric value and a relation is a set of n-tuples of attribute values, wherein said relation interface maintains its tuples in a fixed order and selects subsets of attributes and/or tuples wherein a new relation interface instance is created; and
   an iterator interface for iterating over the tuples of a relation, wherein said iterator acquires the tuple attribute data as said data is being accessed.

2. The system of claim 1, further comprising:
a tuple interface for providing access to tuple values for each attribute of a relation, wherein each tuple interface instance is associated with a particular relation interface instance, and
wherein said iterator interface extends said tuple interface and saves and restores a current position in the tuples of said relation, moves to a tuple position defined by an attribute value, determines whether an iterator's current position corresponds to one of a relation's tuples and whether a current tuple is the first tuple in a continuous segment of tuples within the relation.

3. The system of claim 1, further comprising:
an attribute interface that represents an attribute of a relation and provides access to said attribute's identifier, numeric data type, meta-data, range of values assumed by said attribute in said relation, value status and actual value of said attribute, wherein each attribute interface instance is associated with a relation interface instance.

4. The method of claim 3, wherein said meta-data of an attribute includes a textual description of said attribute, the measurement used for the attribute's values, and allowable range of values for the attribute.

5. The system of claim 1, wherein said relation interface selects a subset of attributes to identify tuples in a relation.

6. The system of claim 1, further comprising an identifier interface that represents an identifier for attributes that can be used across multiple relations, wherein an attribute common to a plurality of relations is identified by a single name.

7. The system of claim 1, further comprising a condition interface for evaluating one or more attribute conditional expressions for selecting attributes for a tuple.

8. The system of claim 1, wherein said relation represents a plurality of time based sensor measurements, wherein each attribute is associated with measurements from one sensor, and each attribute value is associated with a time stamp.

9. The system of claim 8, further comprising a source layer that acquires attribute data from one or more data sources as a time series of measurements with associated timelines and sorts the measurements for each attribute; and
a processing layer that merges timelines for each of the measurement time series into a single merged timeline, makes the measurement data available to an application program, and that includes a cache for storing data acquired from the source layer.

10. The system of claim 9, wherein said cache, when an application requests measurement data in a specified time range with a start time and an end time, determines whether a data cluster stored in said cache covers said time range, and if so, returns said cluster to said application, wherein if a cluster does not cover the requested time range, determines the start time of a new time range from a cluster stored in said cache, wherein if said new start time is before the requested end time, said cache returns data in the range of said requested start time and said new start time, and wherein if said new start time is after the requested end time, said cache returns data in the range of said requested start time and said requested end time.

11. The system of claim 9, wherein said processing layer merges timelines by associating an index variable with each attribute that corresponds with its timestamp in the merged timeline, comparing timestamps of all attributes at a position indicated by said index variable to find a next timestamp, and adding the next timestamp to the merged timeline.

12. The system of claim 1, wherein said relation represents a bitmap color image using red, green, and blue color values, wherein each pixel of said bitmap image is associated with an attribute for each of its coordinates and each of its color values.

13. A computer-implemented object-oriented system for managing relational numerical data, comprising:
a relation interface that provides access to a relation and its attributes and tuples, wherein an attribute is a data item with a numeric value and a relation is a set of n-tuples of attribute values, wherein said relation interface maintains its tuples in a fixed order and selects subsets of attributes and/or tuples wherein a new relation interface instance is created;
a tuple interface for providing access to tuple values for each attribute of a relation, wherein each tuple interface instance is associated with a particular relation interface instance, and
an attribute interface that represents an attribute of a relation provides access to said attribute's identifier, numeric data type, meta-data, range of values assumed by said attribute in said relation, value status and actual value of said attribute, wherein each attribute interface instance is associated with a relation interface instance.

14. The system of claim 13, further comprising an iterator interface for iterating over the tuples of a relation, wherein said iterator acquires the tuple attribute data as said data is being accessed, wherein said iterator interface extends said tuple interface, saves and restores a current position in the tuples of said relation, moves to a tuple position defined by an attribute value, determines whether an iterator's current position corresponds to one of a relation's tuples and whether a current tuple is the first tuple in a continuous segment of tuples within the relation.

15. A program storage device readable by a computer, tangibly embodying a program of instructions executable by the computer to implement an object-oriented system for managing relational numerical data, said system comprising:
a relation interface that provides access to a relation and its attributes and tuples, wherein an attribute is a data item with a numeric value and a relation is a set of n-tuples of attribute values, wherein said relation interface maintains its tuples in a fixed order and selects subsets of attributes and/or tuples wherein a new relation interface instance is created; and
an iterator interface for iterating over the tuples of a relation, wherein said iterator acquires the tuple attribute data as said data is being accessed.

16. The computer readable program storage device of claim 15, said system further comprising:
a tuple interface for providing access to tuple values for each attribute of a relation, wherein each tuple interface instance is associated with a particular relation interface instance, and
wherein said iterator interface extends said tuple interface, saves and restores a current position in the tuples of said relation, moves to a tuple position defined by an attribute value, determines whether an iterator's current position corresponds to one of a relation's tuples and whether a current tuple is the first tuple in a continuous segment of tuples within the relation.

17. The computer readable program storage device of claim 15, said system further comprising:
an attribute interface that represents an attribute of a relation and provides access to said attribute's identifier, numeric data type, meta-data, range of values assumed by said attribute in said relation, value status and actual value of said attribute, wherein each attribute interface instance is associated with a relation interface instance.

18. The computer readable program storage device of claim 17, wherein said meta-data of an attribute includes a textual description of said attribute, the measurement used for the attribute's values, and allowable range of values for the attribute.

19. The computer readable program storage device of claim 15, wherein said relation interface selects a subset of attributes to identify tuples in a relation.

20. The computer readable program storage device of claim 15, said system further comprising an identifier interface that represents an identifier for attributes that can be used across multiple relations, wherein an attribute common to a plurality of relations is identified by a single name.

21. The computer readable program storage device of claim 15, said system further comprising a condition interface for evaluating one or more attribute conditional expressions for selecting attributes for a tuple.

22. The computer readable program storage device of claim 15, wherein said relation represents a plurality of time based sensor measurements, wherein each attribute is associated with measurements from one sensor, and each attribute value is associated with a time stamp.

23. The computer readable program storage device of claim 22, said system further comprising a source layer that acquires attribute data from one or more data sources as a time series of measurements with associated timelines and sorts the measurements for each attribute; and a processing layer that merges timelines for each of the measurement time series into a single merged timeline, makes the measurement data available to an application program, and that includes a cache for storing data acquired from the source layer.

24. The computer readable program storage device of claim 23, wherein said cache, when an application requests measurement data in a specified time range with a start time and an end time, determines whether a data cluster stored in said cache covers said time range, and if so, returns said cluster to said application, wherein if a cluster does not cover the requested time range, determines the start time of a new time range from a cluster stored in said cache, wherein if said new start time is before the requested end time, said cache returns data in the range of said requested start time and said new start time, and wherein if said new start time is after the requested end time, said cache returns data in the range of said requested start time and said requested end time.

25. The computer readable program storage device of claim 23, wherein said processing layer merges timelines by associating an index variable with each attribute that corresponds with its timestamp in the merged timeline, comparing timestamps of all attributes at a position indicated by said index variable to find a next timestamp, and adding the next timestamp to the merged timeline.

26. The computer readable program storage device of claim 15, wherein said relation represents a bitmap color image using red, green, and blue color values, wherein each pixel of said bitmap image is associated with an attribute for each of its coordinates and each of its color values.

\* \* \* \* \*